United States Patent
Kurihara

(10) Patent No.: US 6,757,029 B2
(45) Date of Patent: Jun. 29, 2004

(54) TELEVISION RECEIVING APPARATUS

(75) Inventor: Tadao Kurihara, Tokyo (JP)

(73) Assignee: Sony Corporation, Tokyo (JP)

( * ) Notice: Subject to any disclaimer, the term of this patent is extended or adjusted under 35 U.S.C. 154(b) by 368 days.

(21) Appl. No.: 09/907,065

(22) Filed: Jul. 17, 2001

(65) Prior Publication Data

US 2002/0008787 A1 Jan. 24, 2002

(30) Foreign Application Priority Data

Jul. 19, 2000  (JP) .................................. P2000-219198

(51) Int. Cl.$^7$ .............................................. H04N 5/50
(52) U.S. Cl. ..................................... 348/731; 348/725
(58) Field of Search ................................ 348/731, 735, 348/726, 725, 727–729, 432, 555, 558; 725/151, 131, 139; 455/190.1, 192.1, 192.2; 375/345, 324, 344

(56) References Cited

U.S. PATENT DOCUMENTS

| | | | | | |
|---|---|---|---|---|---|
| 5,245,437 A | * | 9/1993 | Na | ............................. | 348/731 |
| 5,418,815 A | * | 5/1995 | Ishikawa et al. | ............ | 375/216 |
| 5,532,748 A | * | 7/1996 | Naimpally | .................. | 348/432 |
| 5,572,264 A | * | 11/1996 | Mizukami et al. | .......... | 348/735 |
| 5,638,112 A | * | 6/1997 | Bestler et al. | .............. | 725/151 |
| 5,818,517 A | * | 10/1998 | Hudson et al. | ............... | 348/21 |
| 5,825,833 A | * | 10/1998 | Sakaue | ....................... | 375/344 |
| 5,956,098 A | * | 9/1999 | Mizukami et al. | .......... | 348/735 |
| 6,014,178 A | * | 1/2000 | Jeon et al. | ................... | 348/554 |
| 6,016,170 A | * | 1/2000 | Takayama et al. | .......... | 348/731 |
| 6,118,499 A | * | 9/2000 | Fang | .......................... | 348/726 |
| 6,147,713 A | * | 11/2000 | Robbins et al. | ............. | 348/555 |
| 6,348,955 B1 | * | 2/2002 | Tait | ............................. | 348/731 |
| 6,369,857 B1 | * | 4/2002 | Balaban et al. | ............. | 345/555 |
| 6,483,553 B1 | * | 11/2002 | Jung | .......................... | 348/731 |
| 6,498,926 B1 | * | 12/2002 | Ciccarelli et al. | ......... | 455/240.1 |
| 6,622,308 B1 | * | 9/2003 | Raiser | ........................ | 725/151 |

* cited by examiner

Primary Examiner—Michael H. Lee
Assistant Examiner—Paulos Natnael
(74) Attorney, Agent, or Firm—Frommer Lawrence & Haug LLP; William S. Frommer

(57) ABSTRACT

A television receiving apparatus for receiving an analog television broadcast and a digital television broadcast is disclosed, that comprises a tuner means for receiving both an analog television broadcast signal and a digital television broadcast signal, selecting a signal having a desired carrier frequency from the received signals, and converting the selected signal having the desired carrier frequency into an intermediate frequency signal, an analog demodulating means for demodulating the analog television broadcast signal to a video signal, a digital demodulating means for demodulating the digital television broadcast signal to a base band signal, a first filter means disposed downstream of the tuner means, a second filter means disposed between the first filter means and the analog demodulating means, and a third filter means disposed between the first filter means and the digital demodulating means.

6 Claims, 3 Drawing Sheets

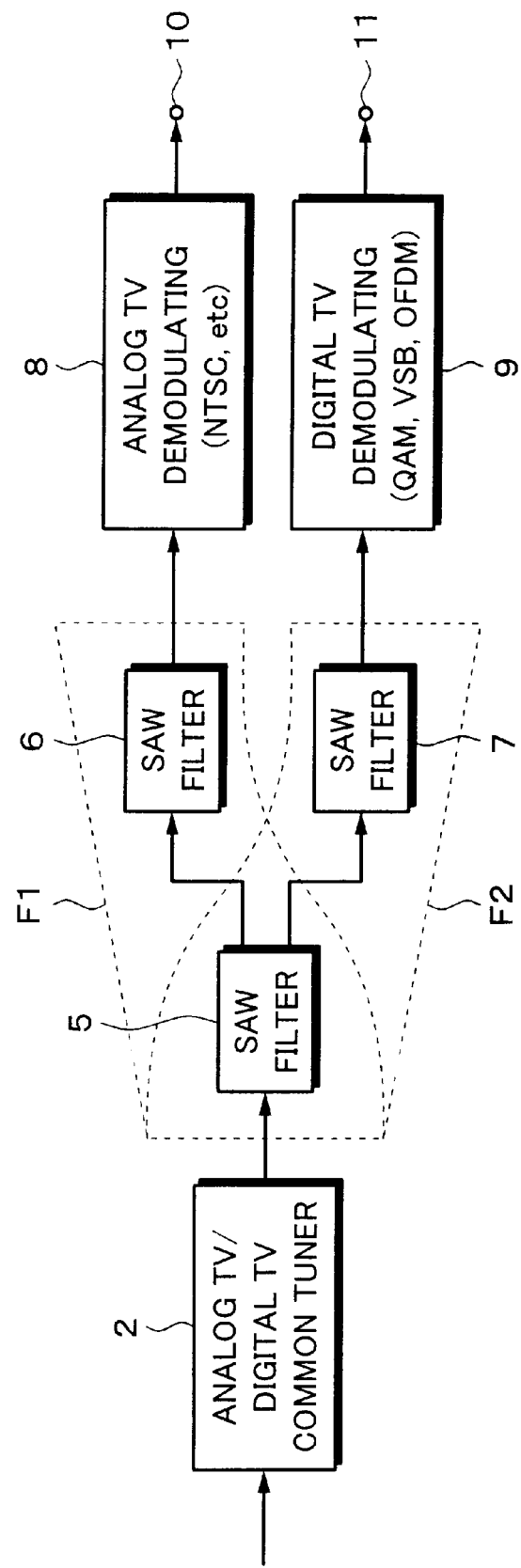

TELEVISION RECEIVING APPARATUS

BACKGROUND OF THE INVENTION

1. Field of the Invention

The present invention relates to a television receiving apparatus having a receiving circuit that can receive both a digital television signal and an analog television signal.

2. Description of the Related Art

In recent years, digital television broadcasts such as digital CS (Communication Satellite) broadcast, BS (Broadcast Satellite) broadcast, and digital ground wave broadcast have been performed. It is predicted that analog television broadcasts will be gradually shifted to digital television broadcasts.

However, even most television broadcasts have been shifted to digital broadcasts, existing analog television broadcasts cannot be stopped. Thus, in the transient period of which the analog television broadcasts are shifted to the digital television broadcasts, both analog television digital broadcasts and digital television digital broadcasts will coexist.

When both analog television broadcasts and digital television broadcasts are performed, television receivers that can receive both analog television broadcasts and digital television broadcasts are desired.

FIG. 1 is a block diagram showing an example of the structure of a receiving circuit of a conventional television receiver. The receiving circuit can receive both digital television broadcasts and analog television broadcasts.

Referring to FIG. 1, an RF (Radio Frequency) signal is received from an antenna (not shown). The RF signal is supplied to an antenna input terminal 101. The signal that is input from the antenna input terminal 101 is supplied to a power splitter 102. The power splitter 102 splits the received signal into an analog broadcast signal and a digital broadcast signal.

The analog broadcast signal is supplied from the power splitter 102 to an analog broadcast tuner 103.

The analog broadcast tuner 103 selects a signal having a desired carrier frequency from the RF signal received through the power splitter 102. The selected signal is converted into an IF (Intermediate Frequency) signal. A frequency set signal is supplied from a controller 115 to the analog broadcast tuner 103. Corresponding to the frequency set signal, the oscillation frequency of a PLL (Phase Locked Loop) synthesizer of the analog broadcast tuner 103 is set. Corresponding to the oscillation frequency, the reception frequency is set. An AGC control signal is supplied from an analog demodulating circuit 108 to an AGC (Automatic Gain Control) circuit of the analog broadcast tuner 103.

An output of the analog broadcast tuner 103 is supplied to an SAW (Surface Acoustic Wave) filter 107. The SAW filter 107 has a pass band for the IF signal received from the analog broadcast tuner 103. The SAW filter 107 should have an excellent characteristic for the analog broadcast.

An output of the SAW filter 107 is supplied to an analog demodulating circuit 108. The analog demodulating circuit 108 amplitude-demodulates the analog television signal to an NTSC format video signal. The demodulated NTSC format analog video signal is output from an output terminal 109.

The digital broadcast signal is supplied from the power splitter 102 to a digital broadcast tuner 104.

The digital broadcast tuner 104 selects a signal having a desired carrier frequency from the RF signal received through the power splitter 102 and converts the selected signal into a predetermined IF (Intermediate Frequency) signal. A frequency set signal is supplied from the controller 115 to the digital broadcast tuner 104. Corresponding to the frequency set signal, the oscillation frequency of a PLL synthesizer of the digital broadcast tuner 104 is set. Corresponding to the oscillation frequency, the reception frequency is set. An AGC control signal is supplied from a digital demodulating circuit 112 to an AGC circuit of a digital broadcast tuner 106.

An output of the digital broadcast tuner 104 is supplied to an SAW filter 110. An output of the SAW filter 110 is supplied to an SAW filter 111. The SAW filters 110 and 111 have a pass band for the IF signal received from the digital broadcast tuner 104. A filter composed of the SAW filters 110 and 111 accomplishes an optimum characteristic for the digital broadcast.

An output of the SAW filter 111 is supplied to the digital demodulating circuit 112. The digital demodulating circuit 112 performs a demodulating is process such as QAM (Quadrature Amplitude Modulation), VSB (Vestigial Sideband Amplitude Modulation), or OFDM (Orthogonal Frequency Division Multiplex). An output of the digital demodulating circuit 112 is output from an output terminal 113.

Thus, according to the related art reference, the analog broadcast tuner 103 and the digital broadcast tuner 104 are independently disposed. The analog broadcast signal and the digital broadcast signal are split by the power splitter 102.

This is because the required characteristic for the analog broadcast signal is different from that for the digital broadcast signal.

In other words, in the analog broadcast, since a video signal is amplitude-modulated, a high video amplitude characteristic is desired. In addition, a high S/N ratio is required. On the other hand, in the digital broadcast, since QAM, VSB, OFDM, or the like is used, an excellent phase characteristic is required. Moreover, in the digital broadcast, a filter having a sharp characteristic is required. In the analog broadcast, when a filter having a sharp characteristic is used, the resolution deteriorates.

To solve such a problem, the power splitter 102 splits the received signal into an analog broadcast signal and a digital broadcast signal. The split analog broadcast signal is processed by the analog broadcast tuner 103, the SAW filter 107, and the analog demodulating circuit 108. The split digital broadcast signal is processed by the digital broadcast tuner 104, the SAW filters 110 and 111, and the digital demodulating circuit 112.

The SAW filter 107 has an optimum characteristic for the analog broadcast.

The SAW filters 110 and 111 have optimum characteristics for the digital broadcast. In the digital system, the SAW filter 110 and the SAW filter 111 are tandem-connected so that a sharp characteristic for the digital broadcast can be obtained.

In the receiving circuit of the conventional television receiver that receives both a conventional analog broadcast and a digital broadcast, since the power splitter 102 splits the RF signal into an analog broadcast signal and a digital broadcast signal, a power loss takes place in the power splitter and thereby the S/N ratio deteriorates.

In addition, the receiving circuit of the television receiver that receives both a conventional analog broadcast and a digital broadcast is provided with the analog broadcast tuner 103 and the digital broadcast tuner 104. In addition, the receiving circuit is provided with the SAW filter 107 for the analog broadcast and the SAW filters 110 and 111 for the digital broadcast. Thus, the circuit scale becomes large.

OBJECTS AND SUMMARY OF THE INVENTION

Therefore, an object of the present invention is to provide a television receiving apparatus that can receive both an analog television broadcast and a digital television broadcast and that allows the circuit scale to be reduced.

Another object of the present invention is to provide a television receiving apparatus that can receive both an analog television broadcast and a digital television broadcast and that allows the S/N ratio to be improved.

The present invention is a television receiving apparatus for receiving an analog television broadcast and a digital television broadcast, comprising a tuner means for receiving both an analog television broadcast signal and a digital television broadcast signal, selecting a signal having a desired carrier frequency from the received signals, and converting the selected signal having the desired carrier frequency into an intermediate frequency signal, an analog demodulating means for demodulating the analog television broadcast signal to a video signal, a digital demodulating means for demodulating the digital television broadcast signal to a base band signal, a first filter means disposed downstream of the tuner means, a second filter means disposed between the first filter means and the analog demodulating means, and a third filter means disposed between the first filter means and the digital demodulating means.

According to the present invention, an analog/digital common tuner is disposed. The analog/digital common tuner has a flat frequency characteristic in the channel selection band for an analog broadcast. A first SAW filter is disposed downstream of the tuner. A second SAW filter is disposed between the first SAW filter and an analog demodulating circuit. A third SAW filter is disposed between the first SAW filter and a digital demodulating circuit. When an analog broadcast is received, the first SAW filter and the second SAW filter form a filter having a characteristic necessary for the analog broadcast. When a digital broadcast is received, the first SAW filter and the third SAW filter form a filter having a characteristic necessary for the digital broadcast. Since the first SAW filter is shared for both the analog broadcast and the digital broadcast, the circuit scale can be reduced. In addition, since an analog broadcast signal and a digital broadcast signal are not split by a power splitter, the S/N ratio can be improved.

The analog demodulating circuit outputs an AGC control signal for an analog broadcast. The digital demodulating circuit outputs an AGC control signal for a digital broadcast. The switch circuit selectively supplies the AGC control signal for the analog broadcast and the AGC control signal for the digital broadcast to the analog/digital common tuner. Thus, when an analog broadcast is received, the reception gain for the analog broadcast can be quickly and optimally set. When a digital broadcast is received, the reception gain for the digital broadcast can be quickly and optimally set.

Likewise, the analog demodulating circuit outputs an AFT control signal for an analog broadcast. The digital demodulating circuit outputs an AFT control signal for a digital broadcast. The switch circuit selectively supplies the AFT control signal for the analog broadcast and the AFT control signal for the digital broadcast to the controller. Thus, depending on which of an analog broadcast or a digital broadcast is received, the AFT control can be optimally performed.

These and other objects, features and advantages of the present invention will become more apparent in light of the following detailed description of a best mode embodiment thereof, as illustrated in the accompanying drawings.

BRIEF DESCRIPTION OF THE DRAWINGS

FIG. 3 is a block diagram for explaining the embodiment of the present invention.

DETAILED DESCRIPTION OF THE PREFERRED EMBODIMENT

Figure 1:
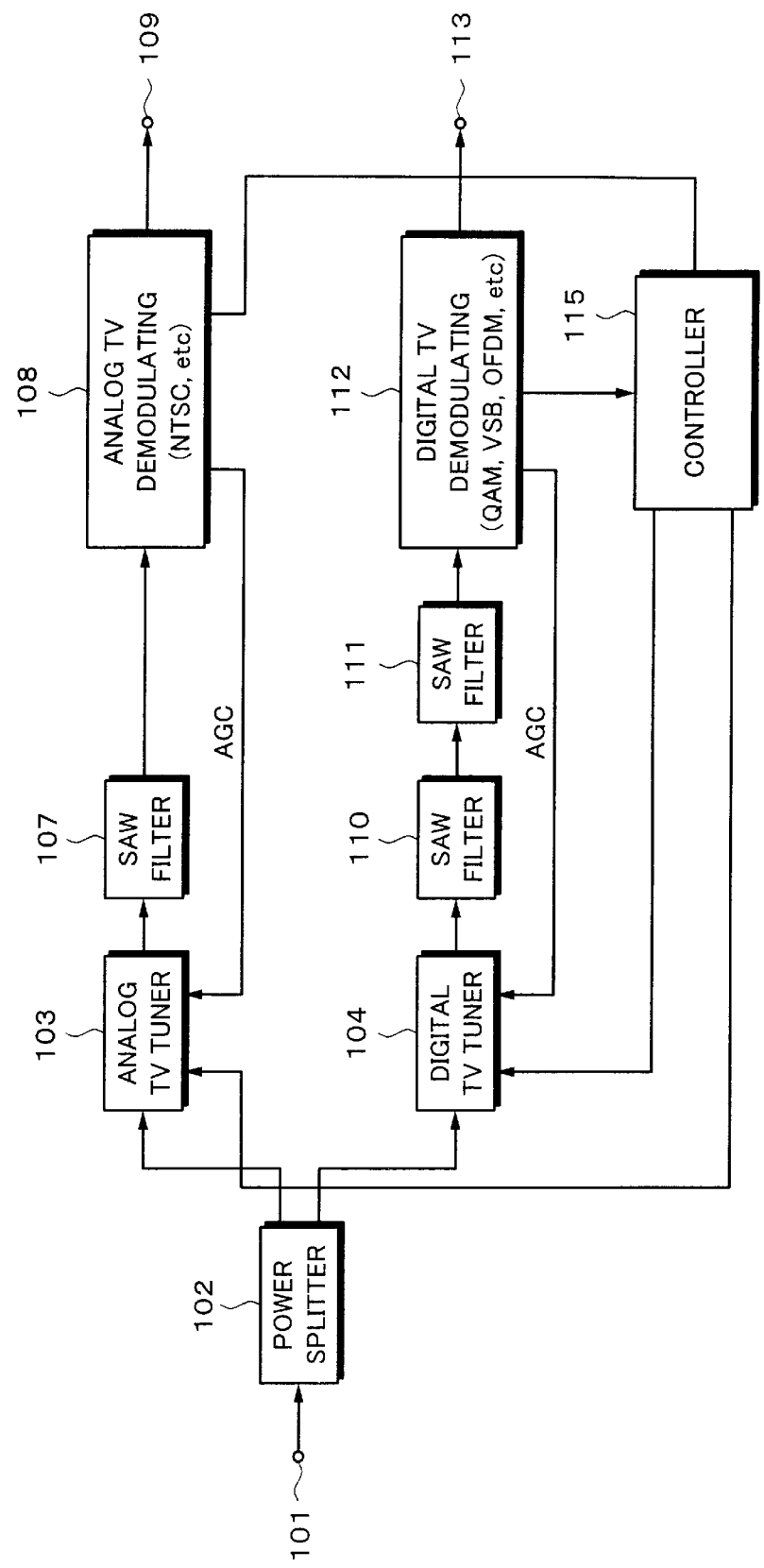
FIG. 1 is a block diagram showing an example of the structure of a receiving circuit of a television receiver that can receive both a conventional analog broadcast and a digital broadcast.
Figure 2:
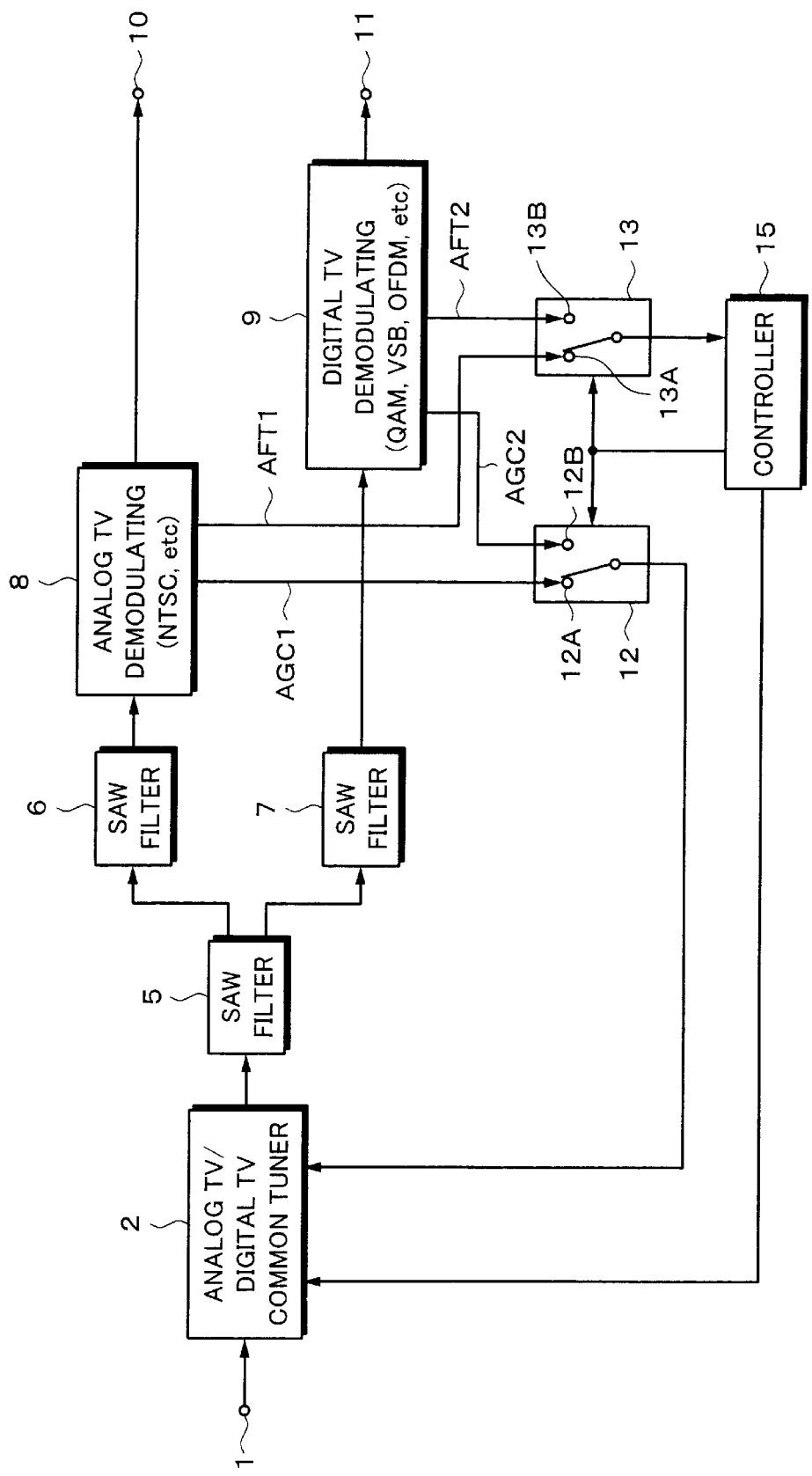
FIG. 2 is a block diagram showing the structure of an embodiment of the present invention.

Next, with reference to the accompanying drawings, an embodiment of the present invention will be described. FIG. 2 is a block diagram showing an example of the structure of a receiving circuit of a television receiver according to the present invention. Referring to FIG. 2, an RF (Radio Frequency) signal is received from an antenna (not shown). The received RF signal is supplied to an antenna input terminal 1. The signal that is input from the antenna input terminal 1 is supplied to an analog/digital common tuner 2. The analog/digital common tuner 2 has a flat frequency characteristic in the channel selection band for the analog broadcast.

The analog/digital common tuner 2 selects a signal having a desired carrier frequency from the RF signal received from the antenna input terminal 1. The selected signal is converted into an IF (Intermediate Frequency) signal. A frequency set signal is supplied from a controller 15 to the analog/digital common tuner 2. Corresponding to the frequency set signal, the oscillation frequency of a PLL (Phase Locked Loop) synthesizer of the analog/digital common tuner 2 is set. Corresponding to the oscillation frequency, the reception frequency is set.

The analog/digital common tuner 2 also has an AGC (Automatic Gain Control) circuit 3. An AGC control signal is supplied from a switch circuit 12 to the AGC circuit 3. The characteristic of the AGC circuit 3 is switched by the switch circuit 12 depending on whether an analog broadcast or the a digital broadcast is received.

An output of the analog/digital common tuner 2 is supplied to an SAW (Surface Acoustic Wave) filter 5. The SAW filter 5 has a band passes for the IF signal received from the analog/digital common tuner 2. The SAW filter 5 should have excellent characteristics for both an analog broadcast and a digital broadcast.

In other words, an analog television broadcast signal has been amplitude-modulated. Thus, when an analog broadcast is received, an excellent amplitude characteristic is required. On the other hand, a digital television signal has been modulated by QAM (Quadrature Amplitude Modulation), VSB (Vestigial Sideband Amplitude Modulation), OFDM (Orthogonal Frequency Division Multiplex), or the like. Thus, when a digital broadcast is received, an excellent phase characteristic is required. Consequently, the SAW filter 5 should have an excellent amplitude characteristic and an excellent phase characteristic.

An output of the SAW filter 5 is supplied to an SAW filter 6 and an SAW filter 7.

The SAW filter 6 is a filter for an analog broadcast. The SAW filter 6 has a pass band for the IF signal received from the analog/digital common tuner 2. The SAW filter 6 should have an excellent amplitude characteristic.

An output of the SAW filter 6 is supplied to an analog demodulating circuit 8. The analog demodulating circuit 8 amplitude-demodulates an analog television signal to an NTSC format video signal. The demodulated NTSC format analog video signal is output from an output terminal 10.

In addition, the analog demodulating circuit 8 detects the signal level of the IF signal and generates an AGC control signal AGC1 for an analog broadcast. The AGC control signal AGC1 is supplied to a terminal 12A of the switch circuit 12. The analog demodulating circuit 8 detects the frequency error of the IF signal. Corresponding to the frequency error, an AFT (Automatic Fine Tuning) signal AFT1 is generated. The AFT control signal AFT1 for the analog broadcast is supplied to a terminal 13A of a switch circuit 13.

The SAW filter 7 for the digital broadcast should have a sharp characteristic and an excellent phase characteristic. An output of the SAW filter 7 is supplied to a digital demodulating circuit 9. The digital demodulating circuit 9 demodulates the digital broadcast signal to a base band signal corresponding to QAM, VSB, OFDM, or the like. The demodulated base band signal is output from an output terminal 11.

The digital demodulating circuit 9 detects the signal level of the IF signal and generates an AGC control signal AGC2 for a digital broadcast. The AGC control signal AGC2 is supplied to a terminal 12B of the switch circuit 12. In addition, the digital demodulating circuit 9 detects the frequency error of the IF signal. Corresponding to the frequency error, an AFT signal AFT2 is generated. The AFT control signal AFT2 for the digital broadcast is supplied to a terminal 13B of the switch circuit 13.

An output of the switch circuit 12 is supplied to an AGC circuit of the analog/digital common tuner 2. A switch control signal is supplied from the controller 15 to the switch circuit 12. When an analog broadcast is received, the switch control signal causes the switch circuit 12 to be placed in the terminal 12A position. When a digital broadcast is received, the switch control signal causes the switch circuit 12 to be placed in the terminal 12B position.

Thus, when an analog broadcast is received, the reception gain is controlled corresponding to the AGC control signal AGC1 generated by the analog demodulating circuit 8. When a digital broadcast is received, the reception gain is controlled corresponding to the AGC control signal AGC2 generated by the digital demodulating circuit 9.

In addition, an output of the switch circuit 13 is supplied to the controller 15. A switch control signal is supplied from the controller 15 to the switch circuit 13. When an analog broadcast is received, the switch control signal causes the switch circuit 13 to be placed in the terminal 13A position. When a digital broadcast is received, the switch control signal causes the switch circuit 13 to be placed in the terminal 13B position.

The controller 15 controls the oscillation frequency of the PLL synthesizer of the analog/digital common tuner 2 corresponding to the AFT control signal that is output from the switch circuit 13.

Thus, when an analog broadcast is received, the AFT control is performed corresponding to the AFT control signal AFT1 generated by the analog demodulating circuit 8. On other hand, when a digital broadcast is received, the AFT control is performed corresponding to the AFT control signal AFT2 generated by the digital demodulating circuit 9.

As described above, the receiving circuit of the television receiver according to the present invention has the analog/digital common tuner 2 that has a flat frequency characteristic -in the channel selection band for an analog broadcast. When an analog broadcast is received, the SAW filter 5 and the SAW filter 6 form a filter having a characteristic necessary for the analog broadcast (the formed filter is denoted by F1 in FIG. 3). When a digital broadcast is received, the SAW filter 5 and the SAW filter 7 form a filter having a characteristic necessary for the digital broadcast (the formed filter is denoted by F2 in FIG. 3). Since the SAW filter 5 is shared for both the analog broadcast and the digital broadcast, the circuit scale can be reduced.

In the television receiver according to the present invention, the analog demodulating circuit 8 outputs the AGC control signal AGC1 for an analog broadcast, whereas the digital demodulating circuit 9 outputs the AGC control signal AGC2 for a digital broadcast. The switch circuit 12 selectively supplies the AGC control signal AGC1 for an analog broadcast and the AGC control signal AGC2 for a digital broadcast to the analog/digital common tuner 2. Thus, when an analog broadcast is received, an optimum reception gain for the analog broadcast is set. When a digital broadcast is received, an optimum reception gain for the digital broadcast is set.

In other words, a digital broadcast is transmitted with a lower power than an analog broadcast so as to prevent the digital broadcast from adversely affecting a channel of the adjacent analog broadcast. Thus, the optimum reception gain for the analog broadcast is different from the optimum reception gain for the digital broadcast. The switch circuit 12 selectively supplies the AGC control signal AGC1 for the analog broadcast and the AGC control signal AGC2 for the digital broadcast to the analog/digital common tuner 2. Thus, depending on which of the analog broadcast or digital broadcast is received, the reception gain can be quickly and optimally set.

Likewise, the analog demodulating circuit 8 outputs the AFT control signal AFT1 for the analog broadcast. The digital demodulating circuit 9 outputs the AFT control signal AFT2 for the digital broadcast. The switch circuit 13 selectively supplies the AFT control signal AFT1 for the analog broadcast and the AFT control signal AFT2 for the digital broadcast to the controller 15. Thus, depending on which of the analog broadcast or digital broadcast is received, the AFT control can be optimally performed.

According to the present invention, an analog/digital common tuner is disposed. The analog/digital common tuner has a flat frequency characteristic in the channel selection band for an analog broadcast. A first SAW filter is disposed downstream of the tuner. A second SAW filter is disposed between the first SAW filter and an analog demodulating circuit. A third SAW filter is disposed between the first SAW filter and a digital demodulating circuit. When an analog broadcast is received, the first SAW filter and the second SAW filter form a filter having a characteristic necessary for the analog broadcast. When a digital broadcast is received, the first SAW filter and the third SAW filter form a filter having a characteristic necessary for the digital broadcast. Since the first SAW filter is shared for both the analog broadcast and the digital broadcast, the circuit scale can be reduced. In addition, since an analog broadcast signal and a digital broadcast signal are not split by a power splitter, the S/N ratio can be improved.

The analog demodulating circuit outputs an AGC control signal for an analog broadcast. The digital demodulating circuit outputs an AGC control signal for a digital broadcast. The switch circuit selectively supplies the AGC control signal for the analog broadcast and the AGC control signal for the digital broadcast to the analog/digital common tuner. Thus, when an analog broadcast is received, the reception gain for the analog broadcast can be quickly and optimally set. When a digital broadcast is received, the reception gain for the digital broadcast can be quickly and optimally set.

Likewise, the analog demodulating circuit outputs an AFT control signal for an analog broadcast. The digital demodulating circuit outputs an AFT control signal for a digital broadcast. The switch circuit selectively supplies the AFT control signal for the analog broadcast and the AFT control signal for the digital broadcast to the controller. Thus, depending on which of an analog broadcast or a digital broadcast is received, the AFT control can be optimally performed.

Although the present invention has been shown and described with respect to a best mode embodiment thereof, it should be understood by those skilled in the art that the foregoing and various other changes, omissions, and additions in the form and detail thereof may be made therein without departing from the spirit and scope of the present invention.

What is claimed is:

1. A television receiving apparatus for receiving an analog television broadcast and a digital television broadcast, comprising:

tuner means for receiving both an analog television broadcast signal and a digital television broadcast signal, selecting a signal having a desired carrier frequency from the received signals, and converting the selected signal having the desired carrier frequency into an intermediate frequency signal;

analog demodulating means for demodulating the analog television broadcast signal to a video signal;

digital demodulating means for demodulating the digital television broadcast signal to a base band signal;

first filter means disposed downstream of said tuner means;

second filter means disposed between said first filter means and said analog demodulating means;

third filter means disposed between said first filter means and said digital demodulating means; and switch means for selectively outputting an AFT control signal for the analog television broadcast and an AFT control signal for the digital television broadcast, the AFT control signal for the analog television broadcast being output from said analog demodulating means, the AFT control signal for the digital television broadcast being output from said digital demodulating means, wherein the reception frequency of said tuner means is set corresponding to the AFT control signal for the analog television broadcast when the analog television broadcast is received, the reception frequency of said tuner means is set corresponding to the AFT control signal for the digital television broadcast when the digital television broadcast is received, and wherein the AFT control signals enable said first filter means to flexibly operate with both the analog television broadcast signal and the digital television broadcast signal.

2. The television receiving apparatus as set forth in claim 1, wherein said first filter means and said second filter means accomplish a desired filtering characteristic for the analog television broadcast signal.

3. The television receiving apparatus as set forth in claim 2, wherein the desired filtering characteristic for the analog television broadcast signal is an excellent amplitude characteristic.

4. The television receiving apparatus as set forth in claim 1, wherein said first filter means and said third filter means accomplish a desired filtering characteristic for the digital television broadcast signal.

5. The television receiving apparatus as set forth in claim 4, wherein the desired filtering characteristic for the digital television broadcast is an excellent phase characteristic.

6. The television receiving apparatus as set forth in claim 1, further comprising:

switch means for selectively outputting an AGC control signal for the analog television broadcast and an AGC control signal for the digital television broadcast, the AGC control signal for the analog television broadcast being output from said analog demodulating means, the AGC control signal for the digital television broadcast being output from said digital demodulating means, wherein when the analog television broadcast is received, the reception gain of said tuner means is set corresponding to the AGC control signal for the analog television broadcast and when is digital television broadcast is received, the reception gain of said tuner means is set corresponding to the AGC control signal television broadcast.

* * * * *